(12) United States Patent
Crespi et al.

(10) Patent No.: US 11,816,919 B2
(45) Date of Patent: *Nov. 14, 2023

(54) SENSOR DEVICE FOR TRANSCAPACITIVE SENSING WITH SHIELDING

(71) Applicant: Synaptics Incorporated, San Jose, CA (US)

(72) Inventors: Lorenzo Crespi, Costa Mesa, CA (US); Ketankumar Balubhai Patel, Lake Forest, CA (US); Balakishan Challa, Irvine, CA (US); Claudio DeBerti, Irvine, CA (US); Guozhong Shen, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,205

(22) Filed: Nov. 7, 2022

(65) Prior Publication Data

US 2023/0110873 A1   Apr. 13, 2023

Related U.S. Application Data

(63) Continuation-in-part of application No. 17/338,831, filed on Jun. 4, 2021, now Pat. No. 11,519,801.

(51) Int. Cl.
*G06V 40/13* (2022.01)
*G01D 5/24* (2006.01)

(52) U.S. Cl.
CPC ........... *G06V 40/1318* (2022.01); *G01D 5/24* (2013.01)

(58) Field of Classification Search
CPC .... G06V 40/1318; G06V 40/19; G06V 10/30; G01D 5/24; G01D 5/2405; G06F 3/041; G06F 3/044; G06F 3/0445–0446; G06F 2203/04111–4112; G06F 2203/04107
See application file for complete search history.

(56) References Cited

U.S. PATENT DOCUMENTS

| | | | |
|---|---|---|---|
| 6,091,082 A | 7/2000 | Thomas | |
| 8,717,775 B1 | 5/2014 | Bolognia | |
| 9,274,662 B2 | 3/2016 | Schwartz | |
| 9,298,299 B2 | 3/2016 | Ludden | |
| 9,298,327 B2 * | 3/2016 | Wenzel | ................ G06F 3/0446 |
| 9,632,638 B2 | 4/2017 | Worfolk | |

(Continued)

*Primary Examiner* — Amy Onyekaba
(74) *Attorney, Agent, or Firm* — Leydig, Voit & Mayer, Ltd.

(57) ABSTRACT

A silicon sensor device includes: a plurality of metal layers; and a plurality of dielectric layers. Each of the plurality of metal layers is disposed on a respective dielectric layer, and wherein each of the plurality of metal layers is separated from an adjacent metal layer by a respective dielectric layer. The plurality of metal layers include: a first metal layer comprising a plurality of transmitter electrodes and a plurality of receiver electrodes; a second metal layer disposed beneath the first metal layer, wherein the second metal layer comprises a plurality of routing traces for the plurality of transmitter electrodes and a plurality of shielding blocks; and one or more circuit layers disposed beneath the second metal layer. A respective shielding block of the plurality of shielding blocks is configured to shield a respective portion of a respective receiver electrode of the plurality of receiver electrodes.

20 Claims, 14 Drawing Sheets

(56) References Cited

U.S. PATENT DOCUMENTS

| | | |
|---|---|---|
| 9,678,586 B2 | 6/2017 | Reynolds |
| 2005/0063571 A1* | 3/2005 | Setlak ................ G06V 40/1306 382/124 |
| 2005/0110103 A1* | 5/2005 | Setlak ................ G06V 40/1306 257/350 |
| 2008/0283180 A1 | 11/2008 | Bachman et al. |
| 2009/0152664 A1 | 6/2009 | Klem et al. |
| 2011/0182488 A1* | 7/2011 | Bredholt ............ G06V 40/1306 382/124 |
| 2012/0256280 A1 | 10/2012 | Erhart et al. |
| 2012/0326992 A1* | 12/2012 | Yeh ...................... G06F 3/0445 345/173 |
| 2014/0226083 A1 | 8/2014 | Dunphy et al. |
| 2015/0160754 A1* | 6/2015 | Wenzel ............. G06F 3/041662 345/174 |
| 2015/0301402 A1 | 10/2015 | Kimura et al. |
| 2016/0247009 A1 | 8/2016 | Lu |
| 2016/0275333 A1* | 9/2016 | Lin .................... G06V 40/1329 |
| 2017/0061187 A1* | 3/2017 | Wen .................. G06V 40/1306 |
| 2017/0061193 A1 | 3/2017 | Young et al. |
| 2017/0177113 A1* | 6/2017 | Shen ..................... G06F 3/0446 |
| 2017/0185197 A1* | 6/2017 | Shepelev ............. G06F 3/0446 |
| 2017/0364726 A1 | 12/2017 | Buchan et al. |
| 2018/0217711 A1* | 8/2018 | Teranishi .............. G06F 3/0416 |
| 2018/0321530 A1* | 11/2018 | Tada .................. G02F 1/136286 |
| 2018/0365466 A1* | 12/2018 | Shim ...................... G06V 40/67 |
| 2019/0018540 A1 | 1/2019 | Ko et al. |
| 2019/0102011 A1* | 4/2019 | Schultz ............... G06F 3/04164 |
| 2020/0226343 A1 | 7/2020 | Kurasawa et al. |
| 2020/0279087 A1* | 9/2020 | Seo ..................... G01S 7/52079 |
| 2020/0395433 A1 | 12/2020 | Sung et al. |
| 2020/0411599 A1* | 12/2020 | Yang ................. G06V 40/1306 |
| 2021/0012079 A1* | 1/2021 | Hou .................. G06V 40/1329 |
| 2021/0019018 A1* | 1/2021 | Guo ...................... H10N 30/05 |
| 2021/0064183 A1* | 3/2021 | Reynolds ............. G06F 3/0443 |
| 2021/0097252 A1 | 4/2021 | Lee et al. |
| 2021/0374377 A1 | 12/2021 | Cheng |
| 2021/0406501 A1* | 12/2021 | Zhu ....................... G06V 10/147 |
| 2021/0406503 A1* | 12/2021 | Hu ...................... G02F 1/13318 |
| 2022/0083757 A1 | 3/2022 | Lee et al. |

* cited by examiner

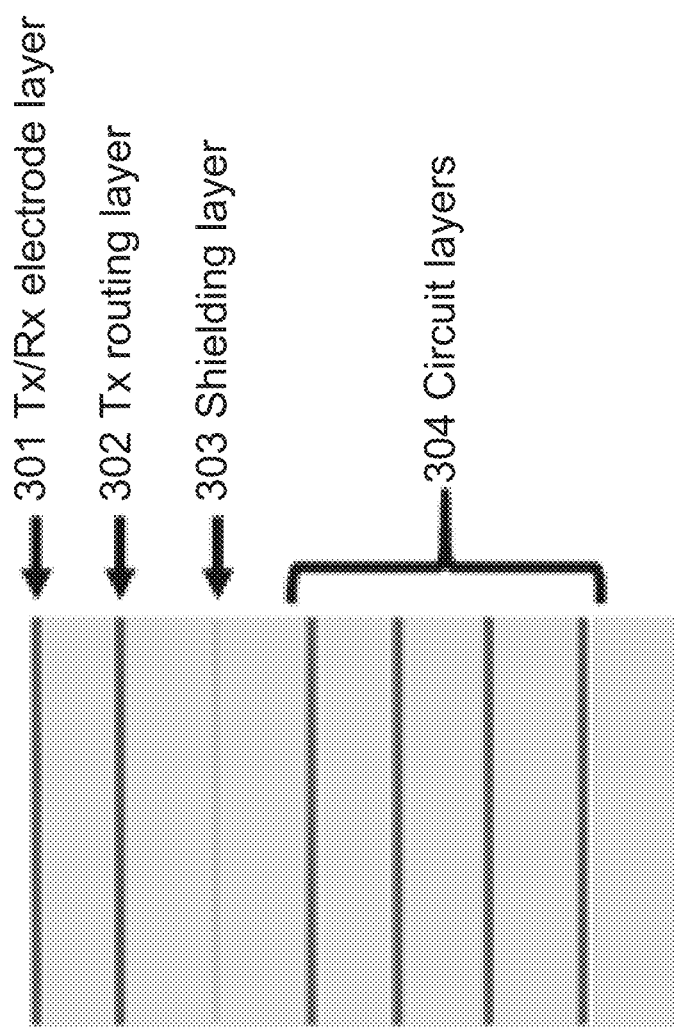

SENSOR DEVICE FOR TRANSCAPACITIVE SENSING WITH SHIELDING

CROSS-REFERENCE TO RELATED APPLICATIONS

This patent application is a continuation-in-part of copending U.S. patent application Ser. No. 17/338,831, filed on Jun. 4, 2021, which is incorporated by reference herein in its entirety.

TECHNICAL FIELD

The described embodiments relate generally to electronic devices, and more specifically, to capacitive sensors.

BACKGROUND

Input devices, including capacitive sensor devices (e.g., touchpads or touch sensor devices), are widely used in a variety of electronic systems. A capacitive sensor device may include a sensing region, often demarked by a surface, in which the capacitive sensor device determines the presence, location and/or motion of one or more input objects. Capacitive sensor devices may be used to provide interfaces for the electronic system. For example, capacitive sensor devices may be used as input devices for larger computing systems (e.g., opaque touchpads integrated in, or peripheral to, notebook or desktop computers). Capacitive sensor devices are also often used in smaller computing systems (e.g., touch screens integrated in cellular phones). Capacitive sensor devices may also be used to detect input objects (e.g., finger, styli, pens, fingerprints, etc.).

The effect of noise and/or energy on receiver electrodes of a sensor device may be an issue in devices where active circuits are located proximate to the receiver electrodes. For example, in silicon sensor devices used for fingerprint sensing, the overall device size may be relatively compact, such that active circuits for the sensor device are located proximate to receiver electrodes, such that noise and/or energy from the active circuits may negatively affect resulting signals obtained via the receiver electrodes.

SUMMARY

In an exemplary embodiment, the present application provides a silicon sensor device which includes a plurality of metal layers and a plurality of dielectric layers. Each of the plurality of metal layers is disposed on a respective dielectric layer. Each of the plurality of metal layers is separated from an adjacent metal layer by a respective dielectric layer. The plurality of metal layers include: a first metal layer comprising a plurality of transmitter electrodes and a plurality of receiver electrodes; a second metal layer disposed beneath the first metal layer, wherein the second metal layer comprises a plurality of routing traces for the plurality of transmitter electrodes; and one or more circuit layers disposed beneath the second metal layer. A respective routing trace for a respective transmitter electrode is configured to shield respective portions of the plurality of receiver electrodes which correspond to a width of the respective transmitter electrode from energy and/or noise originating from the one or more circuit layers. The plurality of metal layers and the plurality of dielectric layers are disposed on a same die.

In another exemplary embodiment, the present application provides an input sensing device. The input sensing device includes: a plurality of sensor electrodes, including a plurality of transmitter electrodes and a plurality of receiver electrodes; a plurality of routing traces for the plurality of transmitter electrodes; and a processing system coupled to the plurality of sensor electrodes, wherein the processing system is configured to obtain an image of an input object in a sensing region by driving sensing signals onto the plurality of transmitter electrodes and obtaining resulting signals via the plurality of receiver electrodes. The plurality of transmitter electrodes and the plurality of receiver electrodes are disposed on a first metal layer of the input sensing device. The plurality of routing traces are disposed on a second metal layer of the input sensing device disposed beneath the first metal layer. At least a part of the processing system is disposed on one or more circuit layers disposed beneath the second metal layer. A respective routing trace for a respective transmitter electrode is configured to shield respective portions of the plurality of receiver electrodes which correspond to a width of the respective transmitter electrode from energy and/or noise originating from the one or more circuit layers.

In yet another exemplary embodiment, the present application provides a sensor device. The sensor device includes: a plurality of metal layers; and a plurality of dielectric layers, wherein each of the plurality of metal layers is disposed on a respective dielectric layer, and wherein each of the plurality of metal layers is separated from an adjacent metal layer by a respective dielectric layer. The plurality of metal layers include: a first metal layer comprising a plurality of transmitter electrodes and a plurality of receiver electrodes; a second metal layer disposed beneath the first metal layer, wherein the second metal layer comprises a plurality of routing traces for the plurality of transmitter electrodes; and one or more circuit layers disposed beneath the second metal layer. A respective routing trace for a respective transmitter electrode is configured to shield respective portions of the plurality of receiver electrodes which correspond to a width of the respective transmitter electrode from energy and/or noise originating from the one or more circuit layers.

In yet another exemplary embodiment, the present application provides a silicon sensor device. The silicon sensor device includes: a plurality of metal layers; and a plurality of dielectric layers. Each of the plurality of metal layers is disposed on a respective dielectric layer, and wherein each of the plurality of metal layers is separated from an adjacent metal layer by a respective dielectric layer. The plurality of metal layers include: a first metal layer comprising a plurality of transmitter electrodes and a plurality of receiver electrodes; a second metal layer disposed beneath the first metal layer, wherein the second metal layer comprises a plurality of routing traces for the plurality of transmitter electrodes and a plurality of shielding blocks; and one or more circuit layers disposed beneath the second metal layer. A respective shielding block of the plurality of shielding blocks is configured to shield a respective portion of a respective receiver electrode of the plurality of receiver electrodes from energy and/or noise originating from the one or more circuit layers. The plurality of metal layers and the plurality of dielectric layers are disposed on a same die.

In yet another exemplary embodiment, the present application provides an input sensing device. The input sensing device includes: a plurality of sensor electrodes, including a plurality of transmitter electrodes and a plurality of receiver electrodes; a plurality of routing traces for the plurality of transmitter electrodes; a plurality of shielding blocks; and a processing system coupled to the plurality of sensor electrodes. The processing system is configured to obtain an image of an input object in a sensing region by driving sensing signals onto the plurality of transmitter electrodes and obtaining resulting signals via the plurality of receiver electrodes. The plurality of transmitter electrodes and the plurality of receiver electrodes are disposed on a first metal layer of the input sensing device. The plurality of routing traces and the plurality of shielding blocks are disposed on a second metal layer of the input sensing device disposed beneath the first metal layer. At least a part of the processing system is disposed on one or more circuit layers disposed beneath the second metal layer. A respective shielding block of the plurality of shielding blocks is configured to shield a respective portion of a respective receiver electrode of the plurality of receiver electrodes from energy and/or noise originating from the one or more circuit layers.

In yet another exemplary embodiment, the present application provides a sensor device. The sensor device includes: a plurality of metal layers; and a plurality of dielectric layers, wherein each of the plurality of metal layers is disposed on a respective dielectric layer, and wherein each of the plurality of metal layers is separated from an adjacent metal layer by a respective dielectric layer. The plurality of metal layers include: a first metal layer comprising a plurality of transmitter electrodes and a plurality of receiver electrodes; a second metal layer disposed beneath the first metal layer, wherein the second metal layer comprises a plurality of routing traces for the plurality of transmitter electrodes and a plurality of shielding blocks; and one or more circuit layers disposed beneath the second metal layer. A respective shielding block of the plurality of shielding blocks is configured to shield a respective portion of a respective receiver electrode of the plurality of receiver electrodes from energy and/or noise originating from the one or more circuit layers.

BRIEF DESCRIPTION OF DRAWINGS

FIG. 3A depicts a side, cross-sectional schematic view of a silicon sensor for transcapacitive sensing according to an exemplary embodiment.

DETAILED DESCRIPTION

Figure 1A:
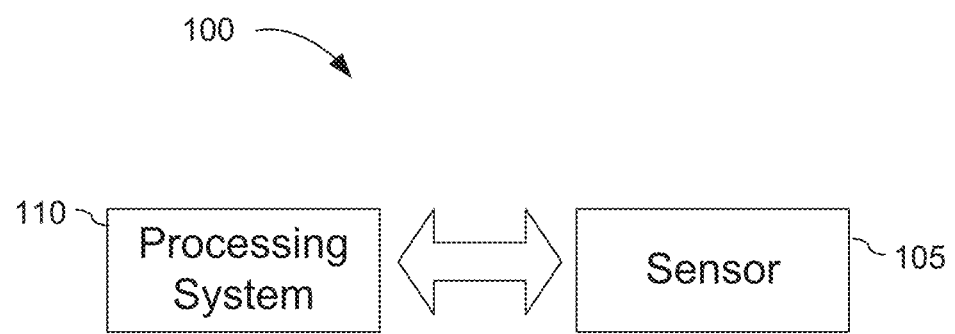
FIGS. 1A-1B depict schematic block diagrams of exemplary input devices.

The drawings and the following detailed description are merely exemplary in nature, and are not intended to limit the disclosed technology or the application and uses of the disclosed technology. Furthermore, there is no intention to be bound by any expressed or implied theory presented in the preceding technical field, background, or the following detailed description.

In the following detailed description of exemplary embodiments, numerous details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description of sensor patterns relies on terminology such as "horizontal", "vertical", "top", "bottom", and "under" to clearly describe certain geometric features of the sensor patterns. The use of these terms is not intended to introduce a limiting directionality. For example, the geometric features may be rotated to any degree, without departing from the disclosure. Further, while patterns of certain sizes are shown in the drawings, the patterns may extend and/or repeat without departing from the disclosure. For example, the use of the term columns and vertical direction is to distinguish between rows and the horizontal direction, respectively. If the input device is rectangular, any direction along the surface may be designated as the vertical direction by which a column extends and any substantially orthogonal direction along the surface may be designated as a vertical direction along which the row extends.

Exemplary embodiments of the present disclosure provide exemplary embodiments of silicon sensors for transcapacitive sensing in which shielding is provided for noise mitigation. In some exemplary embodiments, the shielding may be provided via a dedicated shielding layer which separates circuit layers from an electrode layer on which receiver electrodes are disposed. In some exemplary embodiments, the shielding may be integrated into a routing layer, and the integrated routing and shielding layer separates the circuit layers from an electrode layer on which receiver electrodes are disposed. Additionally, various different exemplary embodiments provide different electrode and/or routing arrangements.

Exemplary embodiments of the present disclosure are able to achieve various advantages over conventional sensor designs. For example, relative to conventional silicon sensors configured for absolute capacitance sensing, exemplary embodiments of the present disclosure are able to achieve smaller sensor die size (for a same sensor array size), less complex circuitry, and cost savings. Additionally, with respect to conventional ball grid array (BGA) sensors configured for transcapacitive sensing, exemplary embodiments of the present disclosure provide for smaller sensor pitch, higher resolution, relative ease of design, and lower cost.

FIG. 1A is a block diagram depicting an example input device 100 within which the present embodiments may be implemented. The input device 100 may be configured to provide input to an electronic system (not shown for simplicity). As used in this document, the term "electronic system" (or "electronic device") broadly refers to any system capable of electronically processing information. Examples of electronic systems include personal computing devices (e.g., desktop computers, laptop computers, netbook computers, tablets, web browsers, e-book readers, and personal digital assistants (PDAs)), wearable computers (e.g., smart watches and activity tracker devices), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system may be a host or a slave to the input device 100.

The input device 100 may be implemented as a physical part of the electronic system, or may be physically separate from the electronic system. The input device 100 may be coupled to (and communicate with) components of the electronic system using wired or wireless interconnections and communication technologies, such as buses and networks. Example technologies may include Inter-Integrated Circuit (I2C), Serial Peripheral Interface (SPI), Personal System/2 (PS/2), Universal Serial Bus (USB), Bluetooth®, Infrared Data Association (IRDA), and various radio frequency (RF) communication protocols defined by the IEEE 802.11 or other standards.

In the example of FIG. 1A, input device 100 includes a sensor 105. The sensor 105 comprises one or more sensing elements configured to sense input provided by one or more input objects in a sensing region of the input device 100. Examples of input objects include fingers, styli, and hands. The sensing region may encompass any space above, around, in, and/or proximate to the sensor 105 in which the input device 100 is able to detect user input (e.g., user input provided by one or more input objects). The sizes, shapes, and/or locations of particular sensing regions (e.g., relative to the electronic system) may vary depending on actual implementations. In some embodiments, the sensing region may extend from a surface of the input device 100 in one or more directions into space, for example, until a signal-to-noise ratio (SNR) of the sensors fall below a threshold suitable for accurate object detection. For example, the distance to which this sensing region extends in a particular direction may be on the order of less than a millimeter, millimeters, centimeters, or more, and may vary significantly with the type of sensing technology used and/or the accuracy desired. In some embodiments, the sensor 105 may detect input involving no physical contact with any surfaces of the input device 100, contact with an input surface (e.g., a touch surface and/or screen) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input.

The sensor elements may be arranged in arrays (regular or irregular patterns) or other configurations to detect inputs. In some implementations, separate sensing elements may be ohmically shorted together to form larger sensor electrodes. Some capacitive sensing implementations may utilize resistive sheets that provide a uniform resistance.

Example capacitive sensing technologies may be based on "self-capacitance" (also referred to as "absolute capacitance") and/or "mutual capacitance" (also referred to as "transcapacitance"). Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more transmitter sensor electrodes (also "transmitter electrodes" or "drive electrodes") and one or more receiver sensor electrodes (also "receiver electrodes" or "pickup electrodes"). For example, transmitter sensor electrodes may be modulated relative to a reference voltage to transmit transmitter signals while receiver sensor electrodes may be held at a relatively constant voltage to receive the transmitted signals. The reference voltage may be, for example, a substantially constant voltage or system ground. In some embodiments, transmitter sensor electrodes and receiver sensor electrodes may both be modulated. The signals received by the receiver sensor electrodes may be affected by environmental interference (e.g., from other electromagnetic signals and/or objects in contact with, or in close proximity to, the sensor electrodes). Sensor electrodes may be dedicated transmitters or receivers, or may be configured to both transmit and receive.

In some implementations, the input device 100 is configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features. In silicon fingerprint sensors, a resolution of around 500 ppi may be used to balance cost and performance, but it will be appreciated that a resolution of 5000 ppi (corresponding to 5.08 µm pitch) or more can be achieved in silicon fingerprint sensors.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture a fingerprint input based on relative movement between the user's finger and the sensing region. In some embodiments, the swipe sensor may include a linear array or a thin two-dimensional array of sensing elements configured to capture multiple frames as the user's finger is swiped or moves over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is of the same or substantially the same size as the imaging area.

In FIG. 1A, a processing system 110 is included with the input device 100. The processing system 110 may comprise parts of or all of one or more integrated circuits (ICs) and/or other circuitry components. The processing system 110 is coupled to the sensor 105, and is configured to operate hardware of the input device 100 (e.g., sensing hardware of the sensor 105) to detect input in the sensing region.

The processing system 110 may include driver circuitry configured to drive sensing signals with sensing hardware of the input device 100 and/or receiver circuitry configured to receive resulting signals with the sensing hardware. For example, processing system 100 may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral device coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals to translate or generate the information provided to the electronic system. For example, the processing system 110 may digitize analog electrical signals received via the sensor electrodes and/or perform filtering or conditioning on the received signals. In some embodiments, the processing system 110 may subtract or otherwise account for a baseline associated with the sensor electrodes. For example, the baseline may represent a state of the sensor electrode when no user input is detected. Accordingly, the information provided by the processing system 110 to the electronic system may reflect a difference between the signals received from the sensor electrodes and a baseline associated with each sensor electrode. As yet further examples, the processing system 110 may determine positional information, recognize inputs as commands, recognize handwriting, match biometric samples, and the like.

In some embodiments, the input device 100 may include a touch screen interface (e.g., display screen), as well as a fingerprint sensor, wherein a sensing region of the fingerprint sensor at least partially overlaps a sensing region of the touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device 100.

Figure 1B:
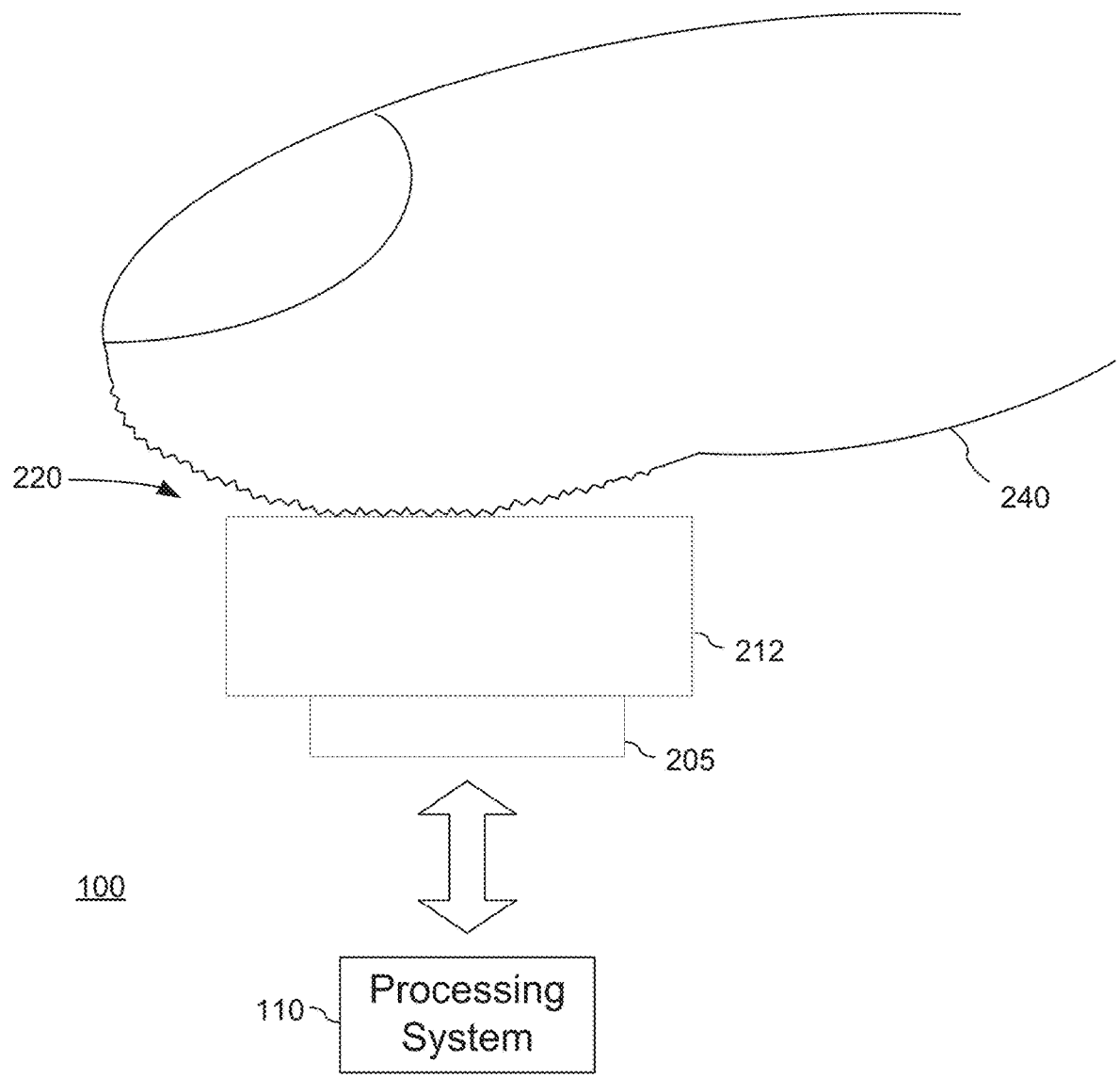

FIG. 1B is a block diagram depicting the input device 100 as including a fingerprint sensor 205. The fingerprint sensor 205 is configured to capture an image of the fingerprint from a finger 240. The fingerprint sensor 205 is disposed underneath a cover layer 212 that provides an input surface for the fingerprint to be placed on or swiped over the fingerprint sensor 205. The sensing region 220 may include an input surface with an area larger than, smaller than, or similar in size to a full fingerprint. The fingerprint sensor 205 has an array of sensing elements with a resolution configured to detect surface variations of the finger 240. In certain embodiments, the fingerprint sensor 205 may be disposed within the active area of a display.

Figure 2:
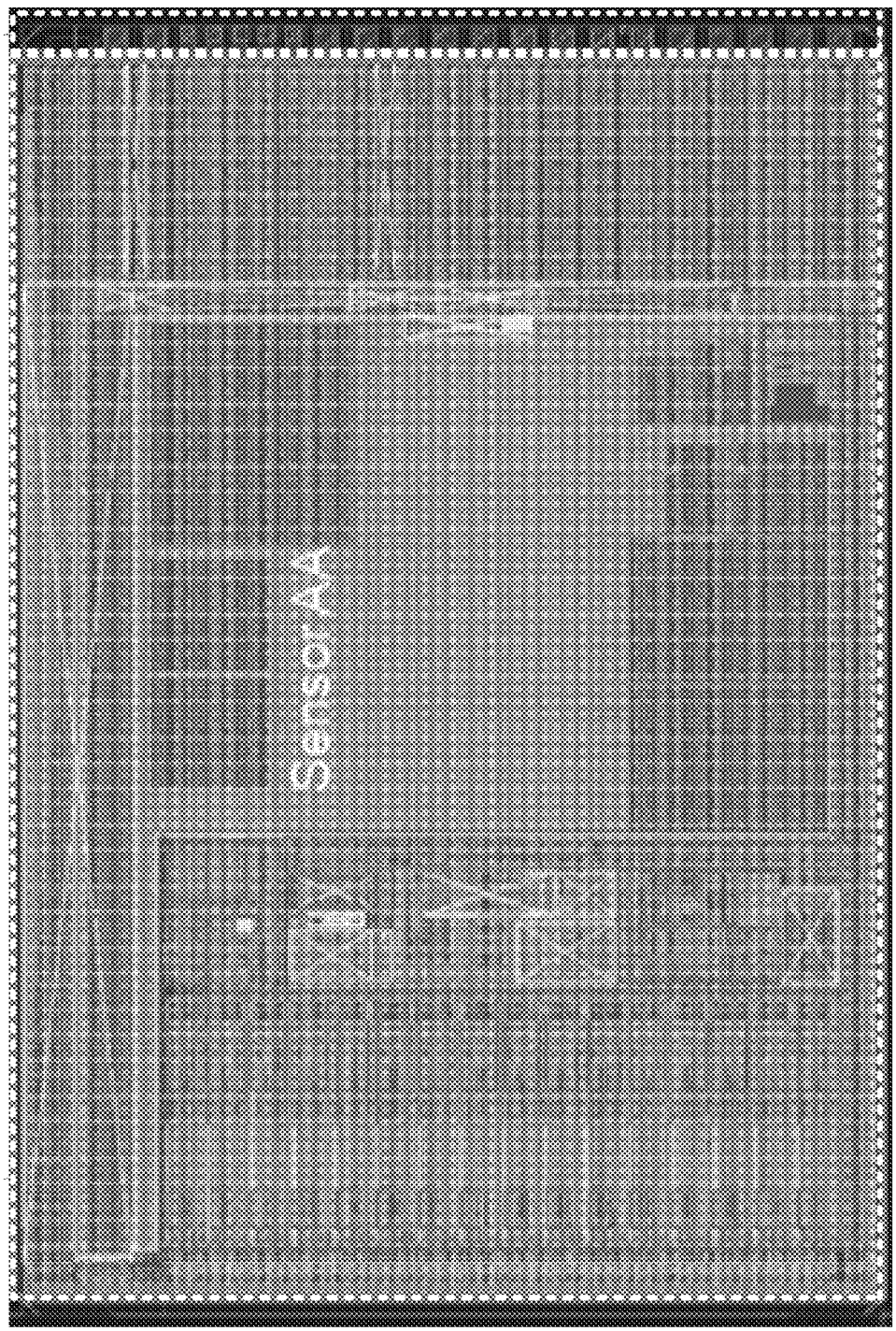
FIG. 2 depicts a top view of a silicon sensor for transcapacitive sensing according to an exemplary embodiment.

FIG. 2 depicts a top view of a silicon sensor for transcapacitive sensing according to an exemplary embodiment. Relative to conventional BGA sensors for transcapacitive sensing, the silicon sensor for transcapacitive sensing shown in FIG. 2 is able to achieve smaller sensor pitch (e.g., 50 μm, or less than 50 μm down to being as small as 10 μm (but it will be appreciated that 50 μm is typically small enough for fingerprint applications)). Additionally, relative to conventional silicon sensors for absolute capacitance sensing, the silicon sensor for transcapacitive sensing shown in FIG. 2 is able to achieve a much smaller die size while providing the same sensor array size (e.g., 3.2 mm×5 mm), with at least 25% cost savings. For example, in conventional absolute capacitance sensors, a die size 50%-100% greater than a sensor array size may be needed to accommodate the circuitry for such sensors, whereas in exemplary embodiments of the application, the die size may be about the same as the sensor array size, with the circuits being disposed beneath the sensor array.

For the silicon sensor shown in FIG. 2, the die size corresponds to the sensor active area (AA) 201 (corresponding to the sensor array size) and a bonding pad area 202, wherein, for example, the sensor AA 201 is around 3.2 mm×5 mm and the size of the bonding pad area is around 3.2 mm×0.2 mm, with the overall die size being around 3.2 mm×5.2 mm. A plurality of circuits may be disposed under the sensor array, including for example, an electrostatic discharge (ESD) protection circuit, an analog front end, a transmission driver circuit, a voltage regulator, a random access memory (RAM), a flash memory, control circuits, a controller (e.g., a microcontroller unit (MCU), a Digital Signal Processor (DSP)), and/or other circuits. Some or all of these circuits may be part of a processing system (e.g., processing system 100 as depicted in FIGS. 1A-1B).

FIG. 3A depicts a side, cross-sectional schematic view of a silicon sensor for transcapacitive sensing according to an exemplary embodiment. In this exemplary embodiment, the silicon sensor includes seven metal layers, including a transmitter/receiver (Tx/Rx) electrode layer 301 (containing transmitter and receiver electrodes), a Tx routing layer 302 (containing routing traces for the Tx electrodes), a shielding layer 303 (containing a shielding structure), and four circuit layers 304 (containing active circuits). The metal layers are separated by dielectric layers, and each metal layer is formed on a respective dielectric layer. A standard silicon fabrication process may be utilized for forming the stackup shown in FIG. 3A such that the metal layers contain silicon, and the thickness of each dielectric layer may be, for example, about 1 μm. The circuit layers 304 may include the plurality of circuits discussed above in connection with FIG. 2. The shielding layer 303 may be, for example, a substantially solid metal layer or a mesh shielding layer which shields the receiver electrodes of the Tx/Rx electrode layer 301 from energy and/or noise from the circuits of the circuit layers 304, thereby blocking or mitigating the effects that such energy and/or noise would have on resulting signals obtained via the receiver electrodes of the Tx/Rx electrode layer 301 in the absence of the shielding layer 303.

It will be appreciated that although the exemplary embodiment depicted in FIG. 3A and other exemplary embodiments discussed below are shown as having four circuit layers 304, exemplary embodiments of the present application are not limited thereto. In other exemplary embodiments, the silicon sensor may have one or more circuit layers. In one exemplary implementation, the silicon sensor may have, for example, three or five circuit layers. Thus, it will be appreciated that each of the exemplary embodiments depicted and discussed herein with four circuit layers may also be implemented with a different number of circuit layers.

Figure 3B:
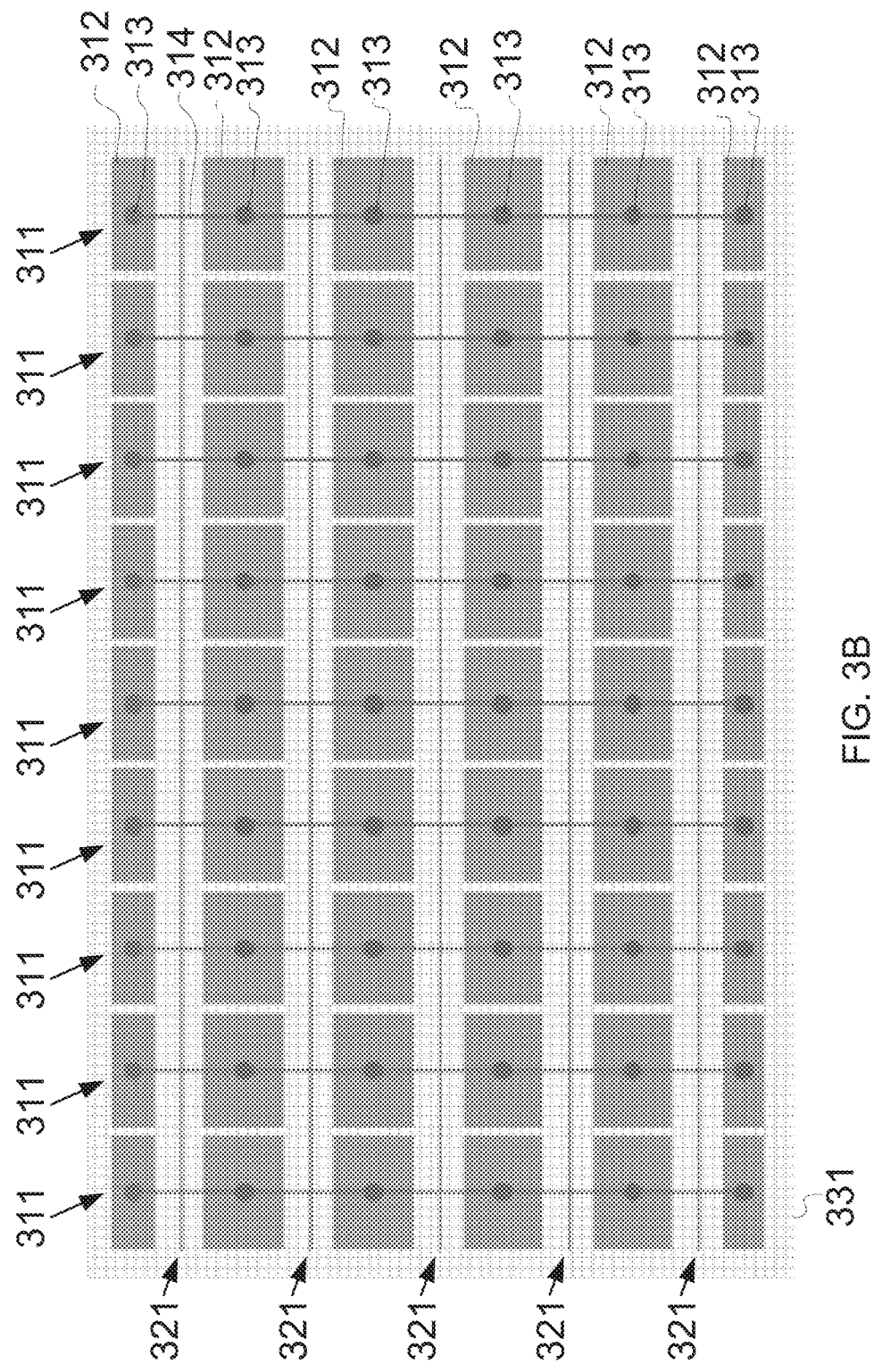
FIG. 3B depicts a top schematic view of the silicon sensor for transcapacitive sensing shown in FIG. 3A which illustrates elements of the Tx/Rx electrode layer, the Tx routing layer, and the shielding layer.

FIG. 3B depicts a top schematic view of the silicon sensor for transcapacitive sensing shown in FIG. 3A which illustrates elements of the Tx/Rx electrode layer 301, the Tx routing layer 302, and the shielding layer 303.

In the example depicted in FIG. 3B, there are nine transmitter electrodes 311 in a first (vertical) orientation and five receiver electrodes 321 in a second (horizontal) orientation. It will be appreciated that other array sizes may be utilized in other exemplary embodiments. For example, instead of a 9 Tx×5 Rx array, other array sizes may include a 64×100 sensor grid. Dimensions of the sensor array may be in the range of, for example, 12 $mm^2$ to 100 $mm^2$.

Each transmitter electrode 311 comprises a plurality of pads 312 disposed in the Tx/Rx electrode layer 301, a plurality of vias 313 which connect the pads 312 in the Tx/Rx electrode layer 301 to the Tx routing layer 302, and routing trace 314 in the Tx routing layer 302 which connects the vias 313 of the transmitter electrode 311 to one another. In an exemplary implementation where the sensor pitch is 50 μm, the horizontal width of the pads 312 may be, for example, close to 50 μm, with a small gap (e.g., 1 μm) being provided between adjacent transmitter electrodes 311. The vertical height of each pad 312 may be, for example, in the range of 20-40 μm, and it will be appreciated that the edge pads 312 at the top and bottom of a respective transmitter electrode which are each dedicated to only one respective receiver electrode 321 may be shorter than the middle pads 312 which are each shared by two receiver electrodes 321.

Additionally, the via size and shape may vary in different implementations, wherein in one example, the vias 313 may be round and have a diameter in the range of 0.5 µm to several µm. The width of the routing trace 314 may be, for example, several µm.

Each receiver electrode 321 is disposed in the Tx/Rx electrode layer 301 and runs orthogonally to the transmitter electrodes 311 in respective spaces of the Tx/Rx electrode layer 301 between adjacent pads 312 of the transmitter electrodes 311. The vertical width of each receiver electrode 321 may be, for example, in the range of 2-10 µm. The vertical distance between a receiver electrode 321 and a pad 312 adjacent to the receiver electrode may also be, for example, in the range of 2-10 µm. The horizontal distance between adjacent pads 312 of different adjacent transmitter electrodes 311 may be, for example, in the range of 0.1-10 µm. It will be appreciated that these described dimensions are merely exemplary and may vary depending on sensor optimization.

Figure 3C:
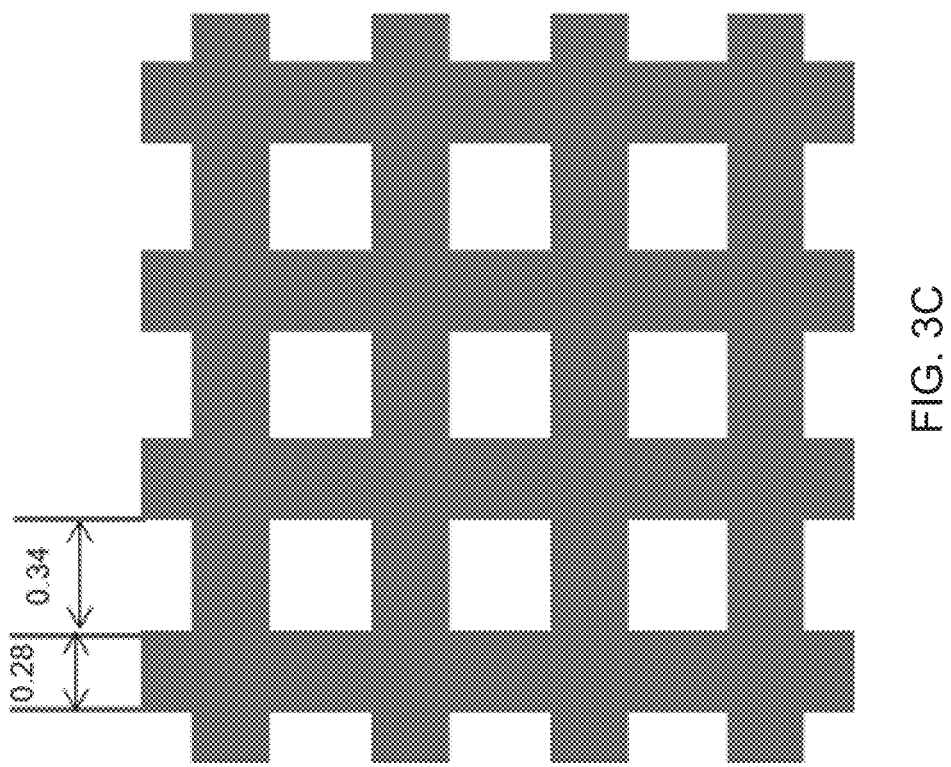
FIG. 3C depicts a top schematic view of part of a shielding layer of the silicon sensor for transcapacitive sensing shown in FIG. 3A.

A mesh shielding 331 is disposed in the shielding layer 303. The mesh shielding 331 shields the receiver electrodes 321 of the Tx/Rx electrode layer 301 from energy and/or noise from the circuits of the circuit layers 304 below the shielding layer 303. In certain exemplary embodiments, a mesh shielding layer as depicted in FIG. 3B may be preferred relative to a solid shielding layer so as to meet a standard metal density design rule. The mesh shielding, for example, may include an array of vertical and horizontal metal lines. In an exemplary implementation, the standard metal density design rule may provide for a maximum metal density of 70%, a minimum trace width of 0.28 µm, and a minimum spacing of 0.28 µm, and the mesh shielding may be implemented with metal lines having a width of 0.28 µm and with adjacent metal lines being spaced 0.34 µm apart (thereby achieving a metal density of 69.9%). FIG. 3C depicts a top schematic view of part of a shielding layer 303 of the silicon sensor for transcapacitive sensing shown in FIG. 3A, wherein the metal lines have a width of 0.28 µm and wherein adjacent metal lines are spaced apart by 0.34 µm.

During operation of a silicon sensor device having the sensor electrode arrangement shown in FIG. 3B and the circuit arrangement shown in FIG. 3A, a transmission driver circuit of the circuit layers 304 may drive sensing signals onto the transmitter electrodes 311 (the sensing signals for a respective transmitter electrode 311 being transmitted along the pads 312, vias 313, and routing trace 314 of the respective transmitter electrode 311), and corresponding resulting signals are obtained via the receiver electrodes 321. The resulting signals may be processed by a processing system partially or fully implemented in the circuit layers 304 to obtain an image of an input object in a sensing region corresponding to the sensor array shown in FIG. 3B.

The sensor pitch of the sensor electrode arrangement (which corresponds to the distance of the center of one sensing pixel to an adjacent sensing pixel) shown in FIG. 3B may be, for example, in the range of 50 µm and 70 µm.

By having the pads 312 of the transmitter electrodes 311 disposed on a top layer (Tx/Rx electrode layer 301) of the silicon sensor device together with the receiver electrodes 321 which are also disposed on the top layer (Tx/Rx electrode layer 301), increased signal (and thereby an increased signal-to-noise ratio (SNR)) is able to be achieved according to exemplary embodiments of the present disclosure. Further, the inclusion of the shielding layer 303 decreases noise, further increasing SNR.

Figure 4A:
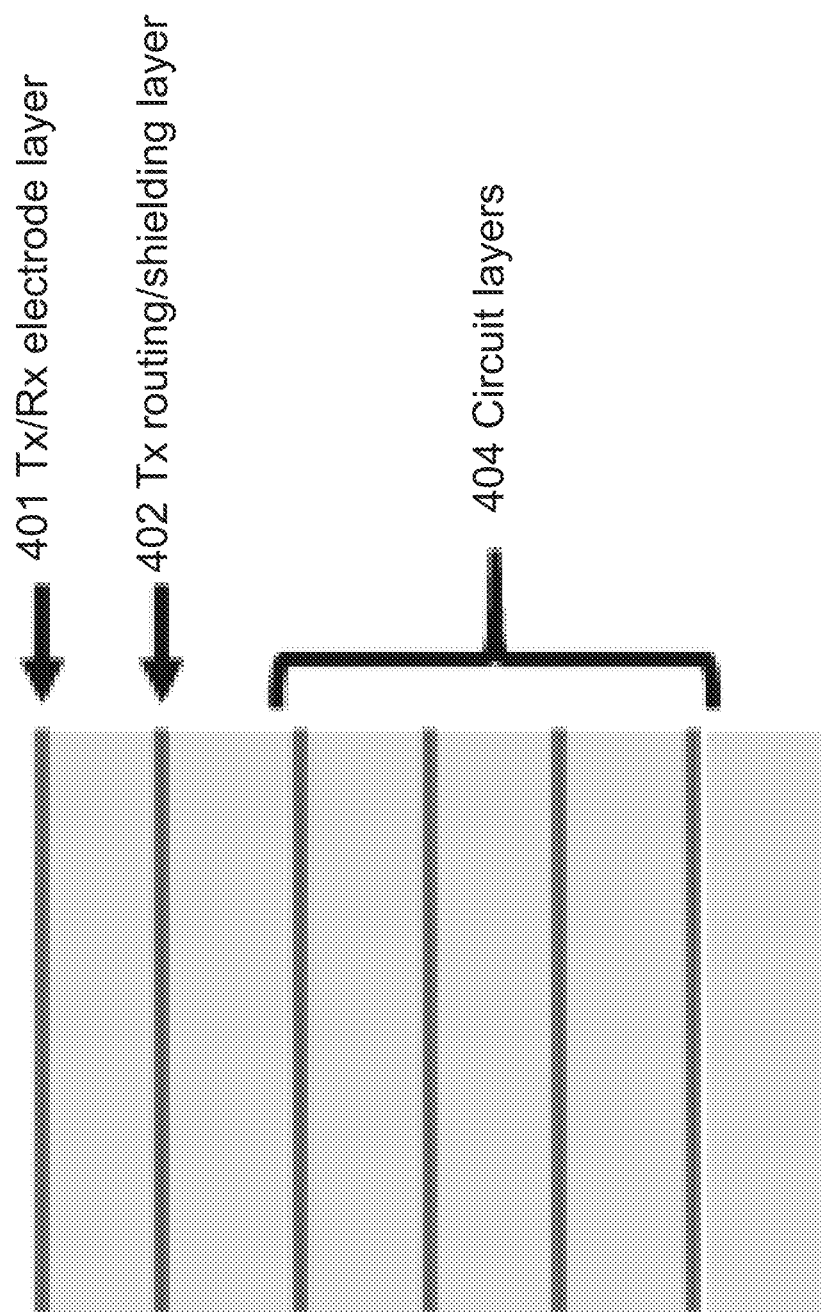
FIG. 4A depicts a side, cross-sectional schematic view of a silicon sensor for transcapacitive sensing according to another exemplary embodiment.

FIG. 4A depicts a side, cross-sectional schematic view of a silicon sensor for transcapacitive sensing according to another exemplary embodiment. In this exemplary embodiment, the silicon sensor includes six metal layers, including a transmitter/receiver (Tx/Rx) electrode layer 401, a transmitter electrode routing/shielding layer 402, and four circuit layers 404. The metal layers are separated by dielectric layers, and each metal layer is formed on a respective dielectric layer. As discussed above, a standard silicon fabrication process may be utilized for forming the stackup shown in FIG. 4A such that the metal layers contain silicon, and the thickness of each dielectric layer may be, for example, about 1 µm. The circuit layers 404 may include the plurality of circuits discussed above in connection with FIG. 2. The transmitter electrode routing/shielding layer 402 includes metal elements which serve as Tx routing traces for the transmitter electrodes of the Tx/Rx electrode layer 401, with portions of the Tx routing traces also providing shielding from energy and/or noise from the circuits of the circuit layers 404, thereby blocking or mitigating the effects that such energy and/or noise would have on resulting signals obtained via the receiver electrodes of the Tx/Rx electrode layer 401 in the absence of the shielding of the transmitter electrode routing/shielding layer 402.

Figure 4B:
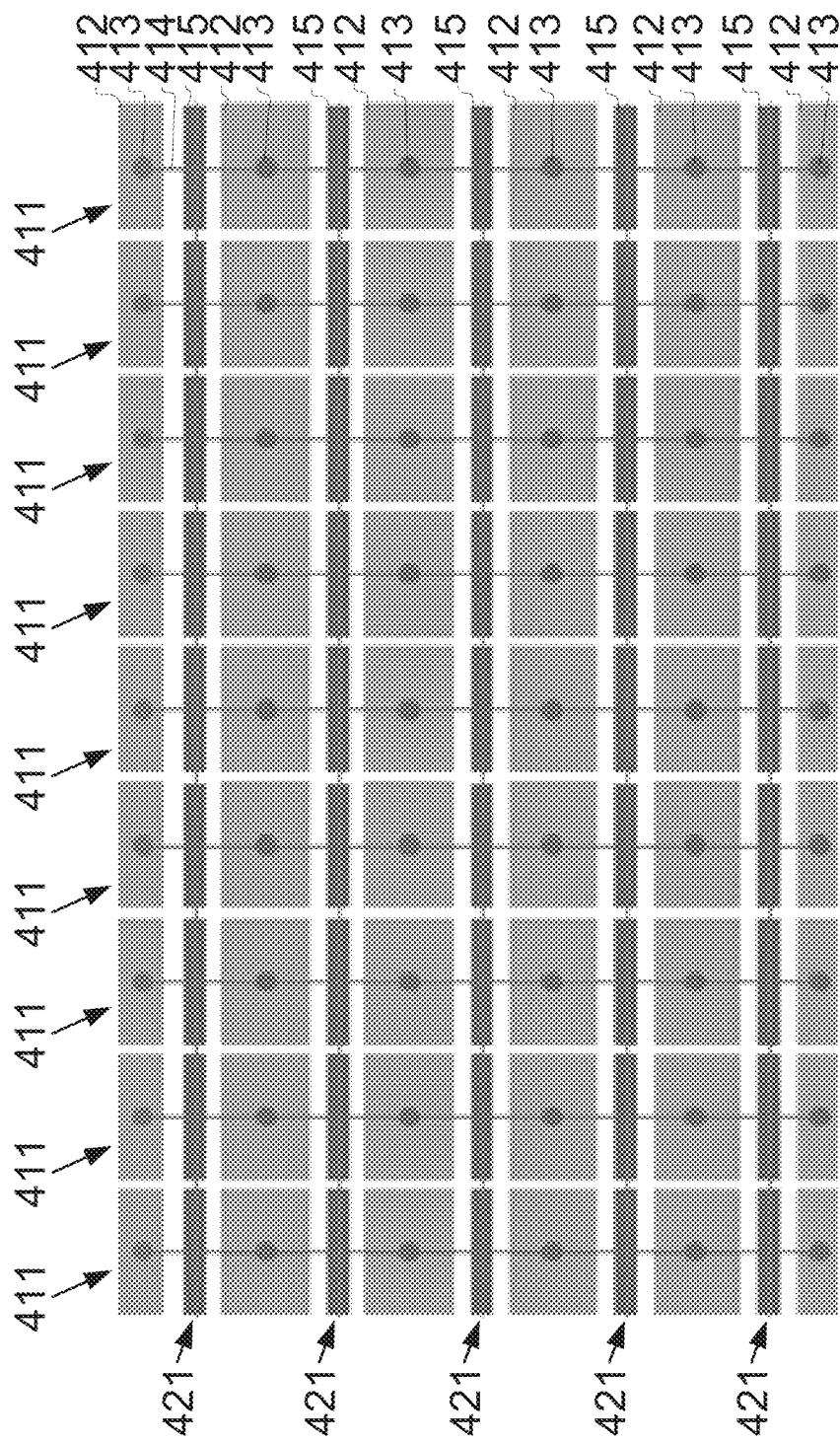
FIG. 4B depicts a top schematic view of the silicon sensor for transcapacitive sensing shown in FIG. 4A which illustrates elements of the Tx/Rx electrode layer and the Tx routing/shielding layer in an overlapped manner.

FIG. 4B depicts a top schematic view of the silicon sensor for transcapacitive sensing shown in FIG. 4A which illustrates elements of the Tx/Rx electrode layer 401 and the Tx routing/shielding layer 402.

In the example depicted in FIG. 4B, there are nine transmitter electrodes 411 in a first (vertical) orientation and five receiver electrodes 421 in a second (horizontal) orientation. It will be appreciated that other array sizes may be utilized in other exemplary embodiments. For example, instead of a 9 Tx×5 Rx array, other array sizes may include a 64×100 sensor grid. Dimensions of the sensor array may be in the range of, for example, 12 mm$^2$ to 100 mm$^2$.

Each transmitter electrode 411 comprises a plurality of pads 412 disposed in the Tx/Rx electrode layer 401, a plurality of vias 413 which connect the pads 412 in the Tx/Rx electrode layer 401 to the Tx routing/shielding layer 402, and routing trace 414 in the Tx routing/shielding layer 402 which connects the vias 413 of the transmitter electrode 411 to one another. In an exemplary implementation where the sensor pitch is 50 µm, the horizontal width of the pads 412 may be, for example, close to 50 µm, with a small gap (e.g., 1 µm) being provided between adjacent transmitter electrodes 411. The vertical height of each pad 412 may be, for example, in the range of 20-40 µm, and it will be appreciated that the edge pads 412 at the top and bottom of a respective transmitter electrode which are each dedicated to only one respective receiver electrode 421 may be shorter than the middle pads 412 which are each shared by two receiver electrodes 421. Additionally, the via size and shape may vary in different implementations, wherein in one example, the vias 413 may be round and have a diameter in the range of 0.5 µm to several µm. The width of the routing trace 414 may be, for example, several µm.

Each receiver electrode 421 is disposed in the Tx/Rx electrode layer 401 and runs orthogonally to the transmitter electrodes 411 in respective spaces of the Tx/Rx electrode layer 401 between adjacent pads 412 of the transmitter electrodes 411. The vertical width of each receiver electrode 421 may be, for example, in the range of 2-10 µm. The vertical distance between a receiver electrode 421 and a pad 412 adjacent to the receiver electrode may also be, for example, in the range of 2-10 µm. The horizontal distance between adjacent pads 412 of different adjacent transmitter electrodes 411 may be, for example, in the range of 0.1-10 µm. It will be appreciated that these described dimensions are merely exemplary and may vary depending on sensor optimization.

In the shielding arrangement shown in FIG. 4B, each routing trace 414 includes a plurality of shielding blocks 415 in the Tx routing/shielding layer 402. Each shielding block 415 of each routing trace 414 overlaps with a respective receiver electrode 421, such that the shielding blocks 415 (which are in the Tx routing/shielding layer 402) are disposed below respective receiver electrodes 421 (which are in the Tx/Rx electrode layer 401). The horizontal width of the shielding blocks 415 may be the same as the horizontal width of the transmitter electrodes 411, which in this embodiment corresponds to the horizontal width of the pads 412 of the transmitter electrodes 411, and the vertical width of the shielding blocks 415 may be a few µm wider (e.g., 1-5 µm wider) than the vertical width of the respective overlapping receiver electrodes 421.

Given a dielectric thickness of ~1 µm between the metal layers shown in FIG. 4A, setting the vertical width of the shielding blocks 415 as being a few µm wider than the vertical width of the respective overlapping receiver electrodes 421 is sufficient to provide shielding for the receiver electrodes 421 such that potential effects of energy and/or noise from the circuit layers 404 on the receiver electrodes 421 are substantially mitigated or blocked.

It will be appreciated that the transmitter electrodes 411 have low impedance from the drive source and are immune to interference from the circuits of the circuit layers 404, such that shielding is not needed to shield the pads 412 of the transmitter electrodes 411 from the circuit layers 404.

During operation of a silicon sensor device having the sensor electrode arrangement shown in FIG. 4B and the circuit arrangement shown in FIG. 4A, a transmission driver circuit of the circuit layers 404 may drive sensing signals onto the transmitter electrodes 411 (the sensing signals for a respective transmitter electrode 411 being transmitted along the pads 412, vias 413, routing trace 414, and shielding blocks 415 of the respective transmitter electrode 411), and corresponding resulting signals are obtained via the receiver electrodes 421. The resulting signals may be processed by a processing system partially or fully implemented in the circuit layers 404 to obtain an image of an input object in a sensing region corresponding to the sensor array shown in FIG. 4B.

The sensor pitch of the sensor electrode arrangement shown in FIG. 4B may be, for example, in the range of 50 µm and 70 µm.

By having the pads 412 of the transmitter electrodes 411 disposed on a top layer (Tx/Rx electrode layer 401) of the silicon sensor device together with the receiver electrodes 421 which are also disposed on the top layer (Tx/Rx electrode layer 401), increased signal (and thereby an increased signal-to-noise ratio (SNR)) is able to be achieved according to exemplary embodiments of the present disclosure. Further, the inclusion of the shielding blocks 415 in the Tx routing/shielding layer 402 decreases noise, further increasing SNR.

The silicon sensor device arrangement shown in FIGS. 4A-4B contains one less metal layer than the silicon sensor device arrangement shown in FIGS. 3A-3B, as the silicon sensor device arrangement shown in FIGS. 4A-4B does not utilize a dedicated shielding layer 303 and instead incorporates shielding elements together with the Tx routing elements (in Tx routing/shielding layer 402). In certain exemplary embodiments, the SNR performance with regard to the two silicon sensor device arrangements is comparable, but by using one less metal layer, the silicon sensor device arrangement shown in FIGS. 4A-4B is able to further achieve ~15% savings with respect to die cost relative to the silicon sensor device arrangement shown in FIGS. 3A-3B.

Figure 5:
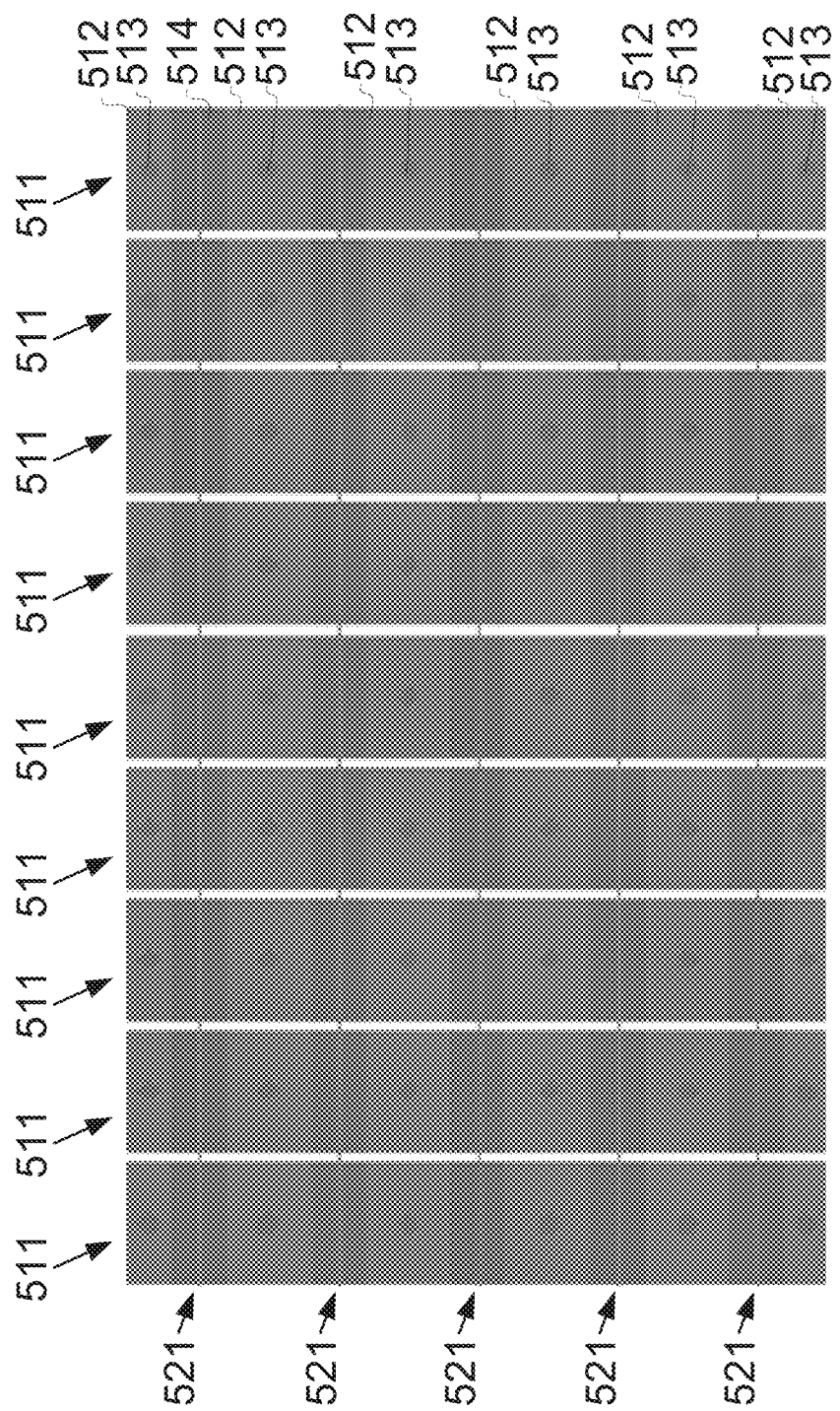
FIG. 5 depicts a top schematic view of a silicon sensor for transcapacitive sensing which illustrates elements of a Tx/Rx electrode layer and a Tx routing/shielding layer in an overlapped manner in an alternate exemplary embodiment.

FIG. 5 depicts a top schematic view of a silicon sensor for transcapacitive sensing which illustrates elements of a Tx/Rx electrode layer and a Tx routing/shielding layer in an alternate exemplary embodiment. The silicon sensor device shown in FIG. 5 has six metal layers in a stackup as depicted in FIG. 4A. Additionally, the sensor electrode arrangement shown in FIG. 5 is similar to the sensor electrode arrangement shown in FIG. 4B (both have nine vertical transmitter electrodes 411/511 having pads 412/512 and vias 413/513 and five receiver electrodes 421/521), except that a wide routing trace 514 disposed in the Tx routing/shielding layer 402 is utilized for each transmitter electrode 511, whereby the wide routing trace 514 provides shielding for the receiver electrodes 521. Thus, the wide routing traces 514 of FIG. 5 perform the functions of both the narrow portions of the routing traces 414 and the shielding blocks 415 of the routing traces 414 of FIG. 4B.

The width of the wide routing traces 514 may be, for example, the same as the width of the pads 512 of the transmitter electrodes 511. The wide routing trace 514 disposed in the Tx routing/shielding layer 402 may have a uniform width spanning the overall top-to-bottom length of a corresponding transmitter electrode 511 such that it overlaps with each of the pads 512 of the transmitter electrode 511. The wide routing traces 514 of the respective transmitter electrodes 511 also overlap respective portions of the respective receiver electrodes 521 to provide shielding for the receiver electrodes 521 with respect to energy and/or noise from the circuit layers 404 beneath the Tx routing/shielding layer 402.

It will be appreciated that, in certain embodiments, SNR performance with regard to the silicon sensor devices shown in FIGS. 5 and 4B may be similar, but the silicon sensor device shown in FIG. 5 may experience higher sensor loading on the transmitter electrodes relative to the silicon sensor device shown in FIG. 4B.

In the embodiments shown in FIG. 4B and FIG. 5, the shielding blocks 415 of FIG. 4B and the wide routing traces 514 of FIG. 5—which are disposed in the Tx routing/shielding layer 402 depicted in FIG. 4A and which provide shielding for respective portions of receiver electrodes 421 and 521 which overlap the shielding blocks 415 and the wide routing traces 514—are part of the Tx routing traces disposed in the Tx routing/shielding layer 402. The relatively large amount of Tx metal used for such Tx routing traces may increase imaging current and Tx loading, as well as power consumption. To reduce the effects of such Tx loading and reduce power consumption, thin Tx routing traces may be used in the Tx routing/shielding layer 402 with shielding pads.

Figure 6A:
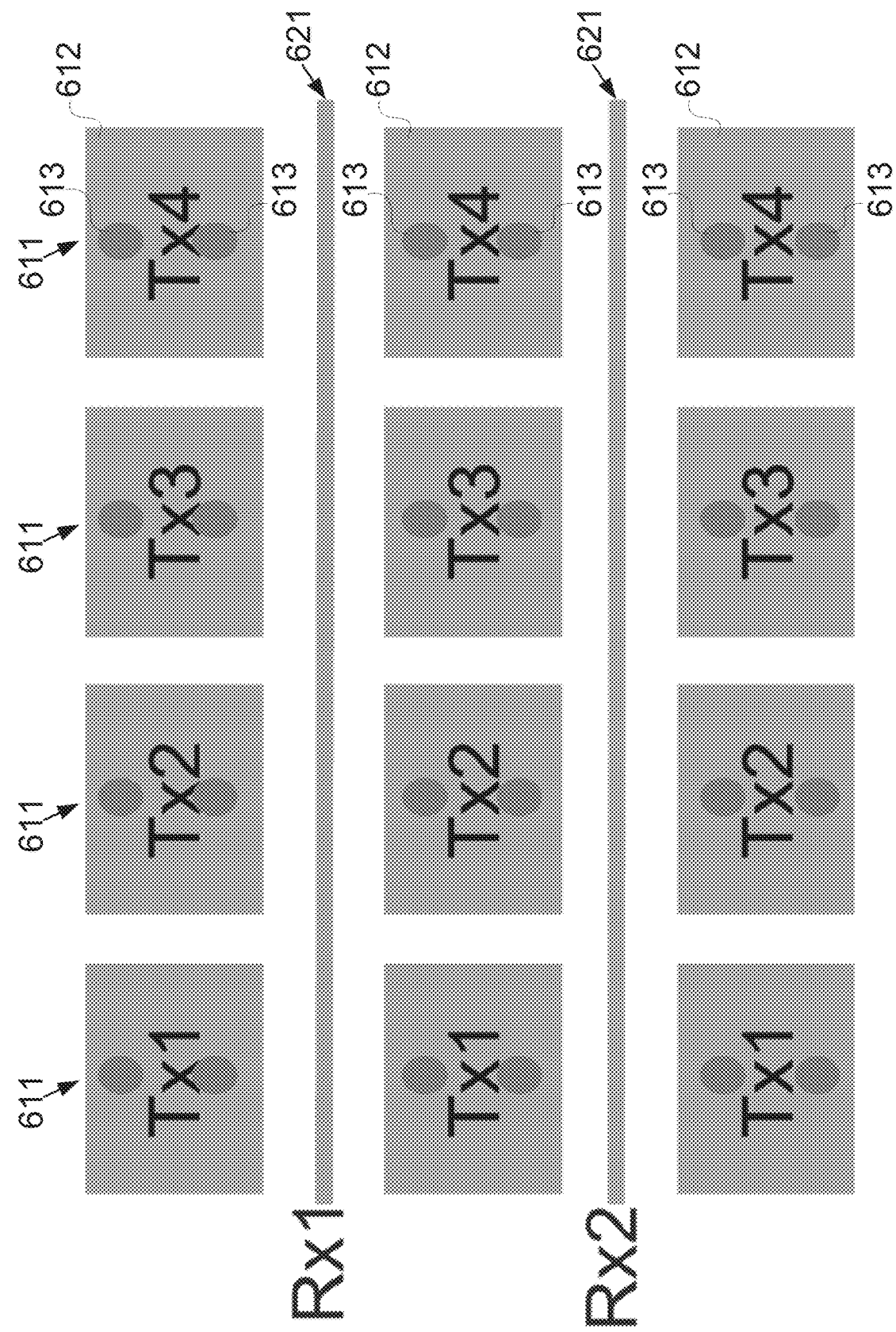
FIG. 6A depicts a top schematic view of a silicon sensor for transcapacitive sensing which illustrates elements of a Tx/Rx electrode layer in another alternate exemplary embodiment.
Figure 6B:
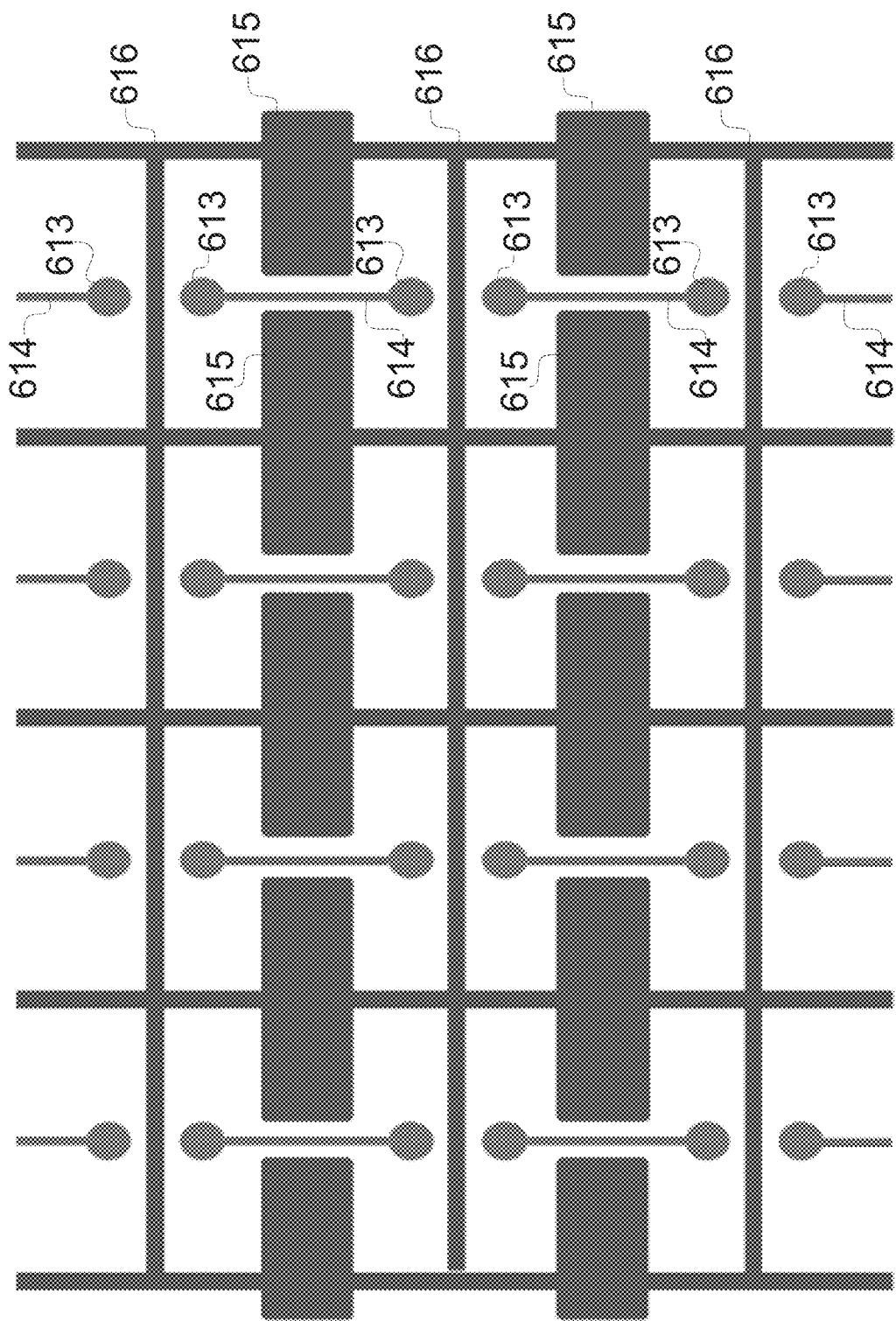
FIG. 6B depicts a top schematic view of a silicon sensor for transcapacitive sensing which illustrates elements of a Tx routing/shielding layer in another alternate exemplary embodiment.
Figure 6C:
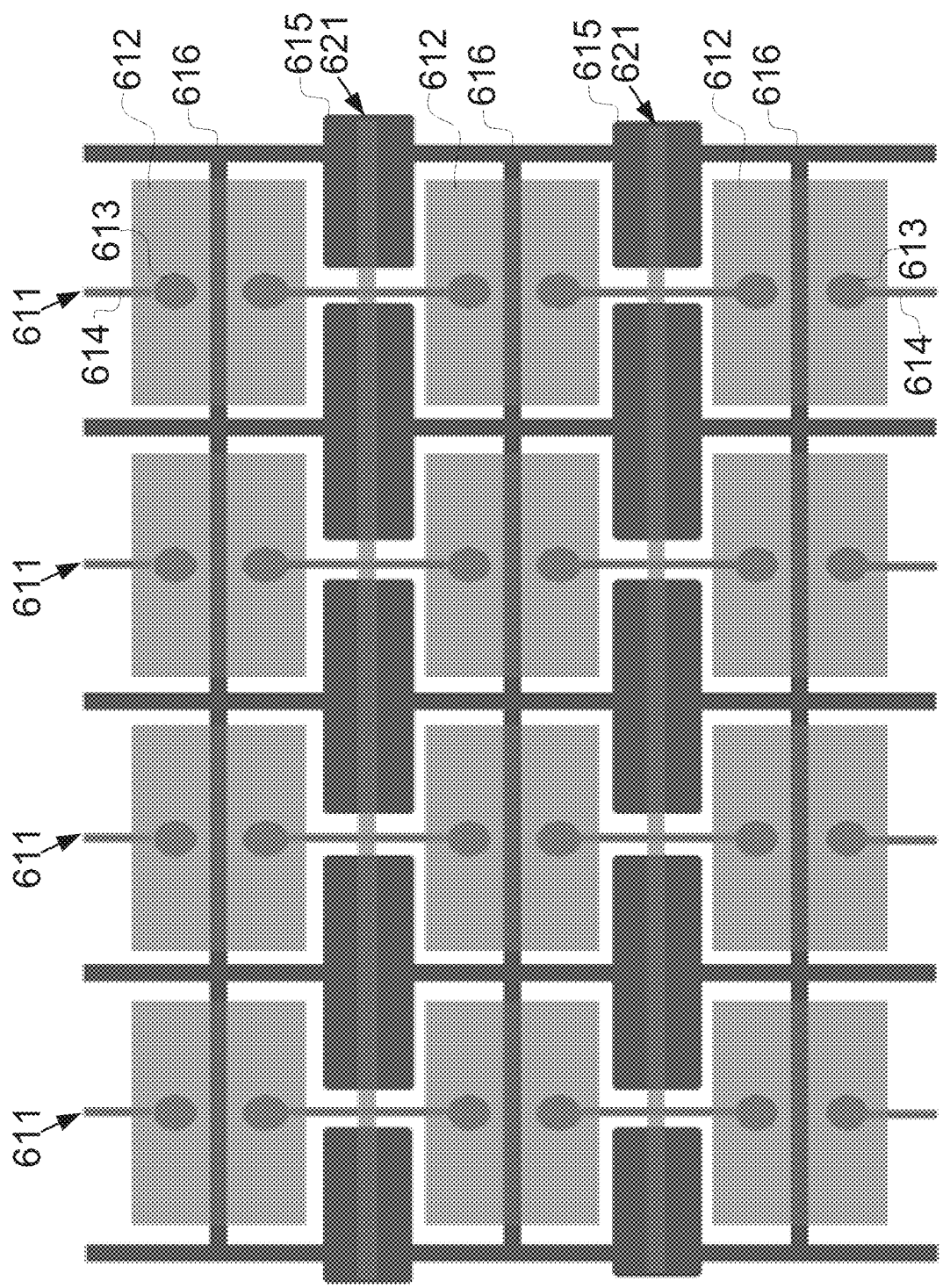
FIG. 6C depicts a top schematic view of a silicon sensor for transcapacitive sensing which illustrates elements of both a Tx/Rx electrode layer and a Tx routing/shielding layer in an overlapped manner in another alternate exemplary embodiment.

FIGS. 6A-6C depict top schematic views of a silicon sensor for transcapacitive sensing which illustrates elements of a Tx/Rx electrode layer and a Tx routing/shielding layer in another alternate exemplary embodiment in which the Tx routing traces are separate from shielding pads in the Tx routing/shielding layer. In particular, FIG. 6A depicts a top schematic view of a silicon sensor for transcapacitive sensing which illustrates elements of a Tx/Rx electrode layer (e.g., Tx/Rx electrode layer 401 of FIG. 4A) in this exemplary embodiment; FIG. 6B depicts a top schematic view of a silicon sensor for transcapacitive sensing which illustrates elements of a Tx routing/shielding layer (e.g., Tx routing/ shielding layer 402 of FIG. 4A) in this exemplary embodiment; and FIG. 6C depicts a top schematic view of a silicon sensor for transcapacitive sensing which illustrates elements of both a Tx/Rx electrode layer (FIG. 6A) and a Tx routing/shielding layer (FIG. 6B) in an overlapped manner in this exemplary embodiment.

In the example depicted in FIGS. 6A-6C, there are four transmitter electrodes 611 (labeled Tx1-Tx4) in a first (vertical) orientation and two receiver electrodes 621 (labeled Rx1-Rx2) in a second (horizontal) orientation. It will be appreciated that other array sizes may be utilized in other exemplary embodiments. For example, instead of a 4 Tx×2 Rx array (which is merely used for purposes of illustration), other array sizes may include a 64×100 sensor grid. Dimensions of the sensor array may be in the range of, for example, 12 mm² to 100 mm².

Each transmitter electrode 611 comprises a plurality of pads 612 disposed in the Tx/Rx electrode layer 401, a plurality of vias 613 which connect the pads 612 in the Tx/Rx electrode layer 401 to the Tx routing/shielding layer 402, and routing traces 614 in the Tx routing/shielding layer 402 which connects the vias 613 of the transmitter electrode 611 to one another. In an exemplary implementation where the sensor pitch is 50 µm, the horizontal width of the pads 612 may be, for example, close to 50 µm, with a small gap (e.g., 1 µm) being provided between adjacent transmitter electrodes 611. The vertical height of each pad 612 may be, for example, in the range of 20-40 µm, and it will be appreciated that the edge pads 612 at the top and bottom of a respective transmitter electrode which are each dedicated to only one respective receiver electrode 621 may be shorter than the middle pads 612 which are each shared by two receiver electrodes 621. Additionally, the via size and shape may vary in different implementations, wherein in one example, the vias 613 may be round and have a diameter in the range of 0.5 µm to several µm. The width of the routing trace 614 may be, for example, several µm.

Each receiver electrode 621 is disposed in the Tx/Rx electrode layer 401 and runs orthogonally to the transmitter electrodes 611 in respective spaces of the Tx/Rx electrode layer 401 between adjacent pads 612 of the transmitter electrodes 611. The vertical width of each receiver electrode 621 may be, for example, in the range of 2-10 µm. The vertical distance between a receiver electrode 621 and a pad 612 adjacent to the receiver electrode may also be, for example, in the range of 2-10 µm. The horizontal distance between adjacent pads 612 of different adjacent transmitter electrodes 611 may be, for example, in the range of 0.1-10 µm. It will be appreciated that these described dimensions are merely exemplary and may vary depending on sensor optimization.

In the shielding arrangement shown in FIGS. 6B-6C (and unlike the shielding arrangement shown in FIGS. 4B and 5), the shielding blocks 615 of the Tx routing/shielding layer 402 are not connected to the routing traces 614 of the Tx electrodes 611. Instead, the shielding blocks 615 are connected to each other via shielding traces 616, and each of the shielding blocks 615 and shielding traces 616 are separated from routing traces 614 and pads 612 (with sufficient space to avoid shorting). These shielding blocks 615, being connected together, thereby form a meshed plane (e.g., having a structure formed by a repeating interlaced metal pattern) which can serve as a ground plane, and may for example be connected to a circuit ground within the sensor device or chip. In an exemplary implementation, the meshed ground plane provides a conductive path in both horizontal and vertical directions for distributing a ground signal across a chip (e.g., the meshed ground plane may connect circuits located in the center of the chip to ground pads located in the periphery of the chip, while having a low electrical resistance relative to using separate individual ground connections). Additionally, by keeping the shielding blocks 615 separate from the Tx routing, the Tx loading may be reduced, thereby lowering power consumption.

Each shielding block 615 overlaps with a respective receiver electrode 621, such that the shielding blocks 615 (which are in the Tx routing/shielding layer 402) are disposed below respective receiver electrodes 621 (which are in the Tx/Rx electrode layer 401). The horizontal width of the shielding blocks 615 may be configured to be as wide as possible while maintaining sufficient separation between a respective shielding block 615 and its adjacent trace(s) 614, and the vertical width of the shielding blocks 615 may be a few µm wider (e.g., 1-5 µm wider) than the vertical width of the respective overlapping receiver electrodes 621.

Given a dielectric thickness of ~1 µm between the metal layers shown in FIG. 4A, setting the vertical width of the shielding blocks 615 as being a few µm wider than the vertical width of the respective overlapping receiver electrodes 621 is sufficient to provide shielding for the receiver electrodes 621 such that potential effects of energy and/or noise from the circuit layers 404 on the receiver electrodes 621 are substantially mitigated or blocked.

It will be appreciated that the transmitter electrodes 611 have low impedance from the drive source and are immune to interference from the circuits of the circuit layers 404, such that shielding is not needed to shield the pads 612 of the transmitter electrodes 611 from the circuit layers 404.

During operation of a silicon sensor device having the sensor electrode arrangement shown in FIGS. 6A-6C and the circuit arrangement shown in FIG. 4A, a transmission driver circuit of the circuit layers 404 may drive sensing signals onto the transmitter electrodes 611 (the sensing signals for a respective transmitter electrode 611 being transmitted along the pads 612, vias 613 and routing traces 614 of the respective transmitter electrode 611), and corresponding resulting signals are obtained via the receiver electrodes 621. The resulting signals may be processed by a processing system partially or fully implemented in the circuit layers 404 to obtain an image of an input object in a sensing region corresponding to the sensor array shown in FIGS. 6A-6C.

The sensor pitch of the sensor electrode arrangement shown in FIGS. 6A-6C may be, for example, in the range of 50 µm and 70 µm.

By having the pads 612 of the transmitter electrodes 611 disposed on a top layer (Tx/Rx electrode layer 401) of the silicon sensor device together with the receiver electrodes 621 which are also disposed on the top layer (Tx/Rx electrode layer 401), increased signal (and thereby an increased signal-to-noise ratio (SNR)) is able to be achieved according to exemplary embodiments of the present disclosure. Further, the inclusion of the shielding blocks 615 in the Tx routing/shielding layer 402 decreases noise, further increasing SNR.

The silicon sensor device arrangement shown in FIGS. 4A and 6A-6C contains one less metal layer than the silicon sensor device arrangement shown in FIGS. 3A-3B, as the silicon sensor device arrangement shown in FIGS. 4A and 6A-6C does not utilize a dedicated shielding layer 303 and instead incorporates shielding elements in Tx routing/shielding layer 402. In certain exemplary embodiments, the SNR performance with regard to the two silicon sensor device arrangements is comparable, but by using one less metal layer, the silicon sensor device arrangement shown in FIGS. 4A and 6A-6C is able to further achieve ~15% savings with respect to die cost relative to the silicon sensor device arrangement shown in FIGS. 3A-3B.

Figure 7C:
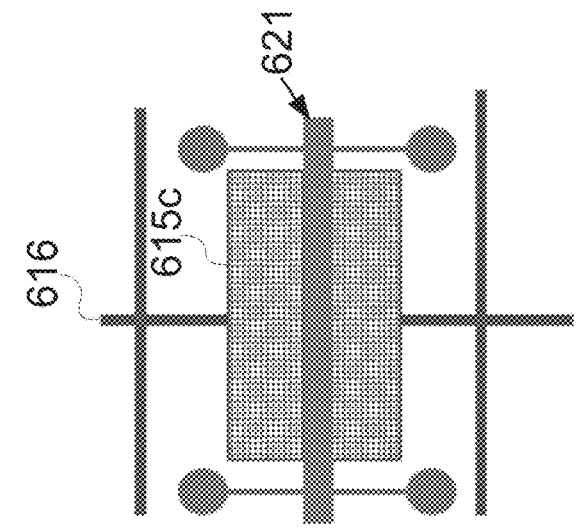
FIGS. 7A-7C depict different exemplary embodiments of shielding blocks disposed in a TX routing/shielding layer.
Figure 7B:
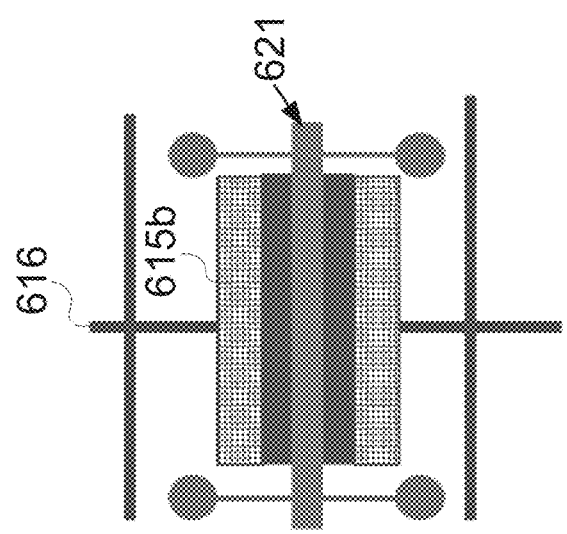
Figure 7A:
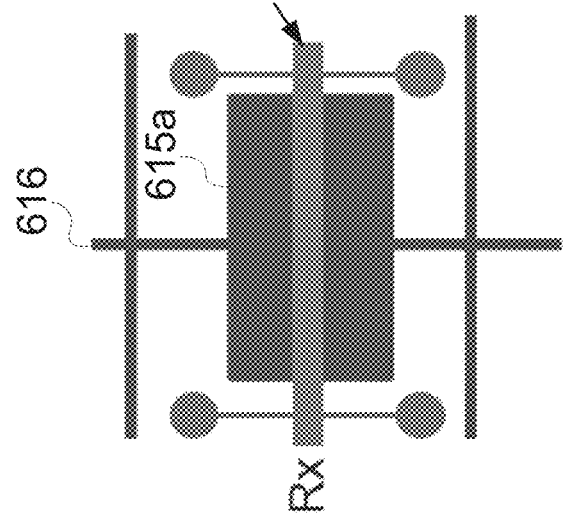

FIGS. 7A-7C depict different exemplary embodiments of shielding blocks disposed in a TX routing/shielding layer. In FIG. 7A, shielding block 615a is completely solid metal. In FIG. 7B, shielding block 615b comprises a solid metal portion and metal mesh portions surrounding the solid metal portion, whereby the solid metal portion overlaps with a respective receiver electrode 621 for which it provides shielding. The solid metal portion may have a vertical width wider than the vertical width of the respective receiver electrode 621 for which it provides shielding. For example, in one example implementation, the receiver electrode may have a vertical width of 10 µm, the solid metal portion may have a vertical width of 12 µm, and the metal mesh portion may extend out for an additional 5-10 µm on both sides of the solid metal portion. In FIG. 7C, shielding block 615c is completely metal mesh.

It will be appreciated that shielding block 615a provides the best shielding performance out of the three embodiments shown in FIGS. 7A-7C because it is completely solid metal, but there may be considerations for limiting the amount of metal to be used for a shielding block (such as silicon design rules and/or material cost). Thus, in certain cases, the shielding configurations shown in FIG. 7B or 7C may be more suitable for a respective silicon sensor device. Further, it will be appreciated that the ratio between the solid metal portion and the metal mesh portions may be adjusted (with regard to FIG. 7B) and/or the dimensions of the metal mesh may be adjusted (with regard to FIGS. 7B and 7C), for example, depending on the silicon design rules for a respective silicon sensor device.

It will be appreciated that the shielding performance of the structure shown in FIG. 7B may be similar to that of the structure shown in FIG. 7A in case of the holes in the mesh portion being smaller than a certain minimum size (related to the wavelength(s) of the radiation being shielded), and/or if the solid portion is sufficiently large to render the leakage through the mesh portion negligible relative to other noise sources.

Further, although the different shielding block configurations shown in FIGS. 7A-7C are depicted in connection with the sensor configuration shown in FIGS. 6A-6C, it will be appreciated that the principles discussed herein with respect to FIGS. 7A-7C are applicable to any sensor device in which shielding blocks are used beneath respective receiver electrodes to shield the respective receiver electrodes from noise originating from one or more circuit layers below the shielding blocks. For example, shielding blocks 415 depicted in FIG. 4B may be formed as solid-only shielding blocks, mesh-only shielding blocks, and/or part-solid/part-mesh shielding blocks. Additionally, the wide routing traces 514 depicted in FIG. 5 may also be formed as solid-only, mesh-only, and/or part-solid/part-mesh (and in the case of part-solid/part-mesh, the portions of the wide routing traces 514 which are solid may include the portions of the wide routing traces 514 which overlap with respective receiver electrodes 521).

Figure 8:
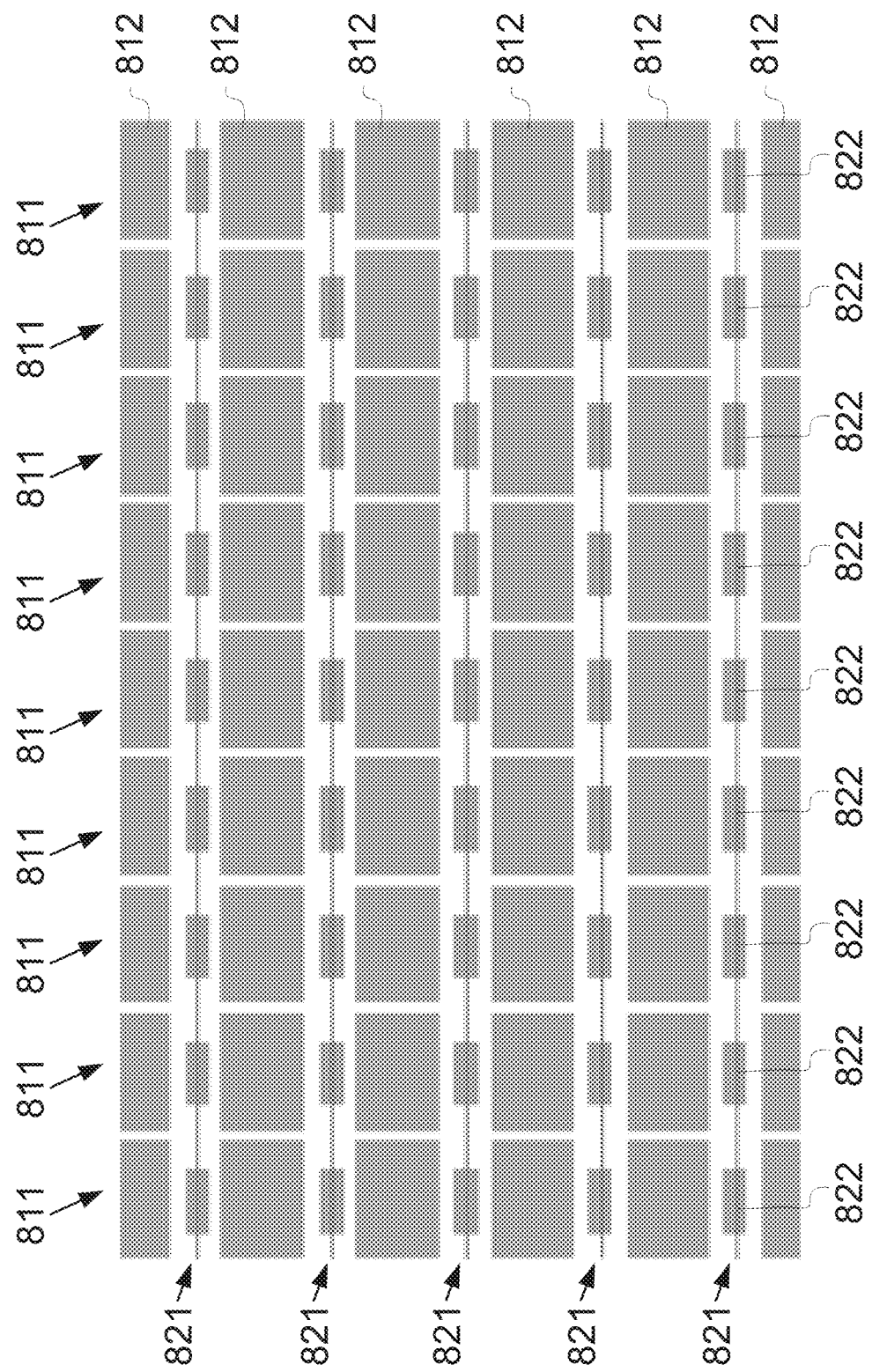
FIG. 8 depicts a top schematic view of a silicon sensor for transcapacitive sensing which illustrates elements of a Tx/Rx electrode layer in another alternate exemplary embodiment.

FIG. 8 depicts a top schematic view of a silicon sensor for transcapacitive sensing which illustrates elements of a Tx/Rx electrode layer in another alternate exemplary embodiment. The silicon sensor device shown in FIG. 8 may have six metal layers in a stackup as depicted in FIG. 4A, or may have seven metal layers in a stackup as depicted in FIG. 3A. The silicon sensor device shown in FIG. 8 includes a plurality of receiver electrodes 821 in a first (horizontal) orientation and a plurality of transmitter electrodes 811 in a second (vertical) orientation, each respective transmitter electrode 811 having a plurality of interconnected pads 812 (vias and routing for the pads 812 are not shown in FIG. 6, which only illustrates elements of the top Tx/Rx electrode layer). The vias, routing, and shielding for the silicon sensor device shown in FIG. 8 may be arranged in accordance with the exemplary embodiments of FIGS. 3B, 4B, 5, 6A-6C and/or 7A-7C as depicted and discussed above.

In the embodiment shown in FIG. 8, each of the receiver electrodes 821 does not have uniform vertical width. Instead, each of the receiver electrodes 821 comprises a plurality of relatively wide portions (also referred to herein as "receiver blocks 822") aligned to respective transmitter electrodes 811, and each of the receiver blocks 822 of a respective receiver electrode 821 is connected to one another via relatively thin portions of the respective receiver electrode 821. The relatively thin portions of a respective receiver electrode 821 may have a vertical width in the range of, for example, 2-10 µm, and the receiver blocks 822 may have a vertical width that is wider than the relatively narrow portions by, for example, 5-10 µm. For example, in one exemplary implementation, the relatively thin portions of the receiver electrodes 821 may have a vertical width of 4 µm and the receiver blocks 822 of the receiver electrodes 821 may have a vertical width of 10 µm. The centers of the receiver blocks 822 may be vertically aligned to the centers of respective transmitter electrodes 811 as shown in FIG. 8, and the horizontal widths of the receiver blocks 822 may be narrower than the horizontal widths of the pads 812 of respective transmitter electrodes 811 based on sensor optimization. For example, the horizontal width of the receiver blocks 822 may be in the range of 10-40 µm (relative to a transmitter pad horizontal width of close to 50 µm).

It will thus be appreciated that the electrode arrangement shown in FIG. 8 may be used in combination with the via/routing/shielding arrangements shown in FIGS. 3B, 4B, 5, 6A-6C and/or 7A-7C. In the case of the electrode arrangement shown in FIG. 8 being used with the via/routing/shielding arrangement shown in FIG. 4B or 6A-6C, each receiver block in the Tx/Rx electrode layer shown in FIG. 8 is overlapped by a respective shielding block in the Tx routing/shielding layer which is larger than the receiver block on all sides (e.g., a few µm wider in both the horizontal and vertical orientations) to provide sufficient shielding for the respective receiver block.

In certain embodiments, relative to the uniformly thin receiver electrodes shown in FIGS. 3B, 4B, 5, 6A-6C and 7A-7C, the receiver electrodes having receiver blocks 622 shown in FIG. 8 may provide for an increase in signal (thereby increasing SNR).

It will be appreciated that the exemplary embodiments depicted and discussed herein are merely illustrative with respect to the inventive principles, and that the invention is not limited thereto. For example, although FIGS. 3B, 4B, 5, 6A-6C and 8 depict the transmitter electrodes in a vertical orientation and the receiver electrodes in a horizontal orientation, it will be appreciated that other relative orientations may be utilized (e.g., horizontal transmitter electrodes and vertical receiver electrodes). To provide another example, although the electrode shapes shown in the illustrative embodiments are mostly rectangular, it will be appreciated that other shapes may be used (such as pads and blocks having rounded corners, diamond shapes, or other variations).

It will further be appreciated that although the exemplary embodiments depicted and discussed herein pertain to silicon sensors (i.e., sensors in which the sensor electrodes are included in the die), the principles discussed herein are not limited thereto and may also be applied to sensor devices in which the sensor electrodes are located outside of a die. For example, non-silicon sensors such as BGA sensors and flex sensors may also utilize shielding layers as shown in FIGS. 3A-3B and/or may benefit from having a combined Tx routing/shielding layer as shown in FIGS. 4A-4B, 5 and 6A-6C.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A silicon sensor device, comprising:
    a plurality of metal layers; and
    a plurality of dielectric layers, wherein each of the plurality of metal layers is disposed on a respective dielectric layer, and wherein each of the plurality of metal layers is separated from an adjacent metal layer by a respective dielectric layer;
    wherein the plurality of metal layers include:
        a first metal layer comprising a plurality of transmitter electrodes and a plurality of receiver electrodes;
        a second metal layer disposed beneath the first metal layer, wherein the second metal layer comprises a plurality of routing traces for the plurality of transmitter electrodes and a plurality of shielding blocks; and
        one or more circuit layers disposed beneath the second metal layer;
    wherein a respective shielding block of the plurality of shielding blocks is configured to shield a respective portion of a respective receiver electrode of the plurality of receiver electrodes from energy and/or noise originating from the one or more circuit layers; and
    wherein the plurality of metal layers and the plurality of dielectric layers are disposed on a same die.

2. The silicon sensor device according to claim 1, wherein the plurality of shielding blocks are connected to the plurality of routing traces.

3. The silicon sensor device according to claim 1, wherein the plurality of shielding blocks are not connected to the plurality of routing traces.

4. The silicon sensor device according to claim 1, wherein the plurality of shielding blocks are connected to one another via shielding traces.

5. The silicon sensor device according to claim 4, wherein the plurality of shielding blocks and the shielding traces form a ground plane.

6. The silicon sensor device according to claim 1, wherein a respective shielding block of the plurality of shielding blocks is formed of solid metal.

7. The silicon sensor device according to claim 1, wherein a respective shielding block of the plurality of shielding blocks comprises both a solid metal portion and a metal mesh portion.

8. The silicon sensor device according to claim 1, wherein a respective shielding block of the plurality of shielding blocks is formed of metal mesh.

9. The silicon sensor device according to claim 1, further comprising:
    a plurality of vias disposed in a dielectric layer between the first and second metal layers, wherein the plurality of vias connect the plurality of transmitter electrodes in the first metal layer to the plurality of routing traces in the second metal layer.

10. The silicon sensor device according to claim 1, wherein the one or more circuit layers comprise: an electrostatic discharge (ESD) protection circuit, an analog front end, a transmission driver circuit, a voltage regulator, a random access memory (RAM), a flash memory, control circuits, and/or a controller.

11. An input sensing device, comprising:
    a plurality of sensor electrodes, including a plurality of transmitter electrodes and a plurality of receiver electrodes;
    a plurality of routing traces for the plurality of transmitter electrodes;
    a plurality of shielding blocks; and
    a processing system coupled to the plurality of sensor electrodes, wherein the processing system is configured to obtain an image of an input object in a sensing region by driving sensing signals onto the plurality of transmitter electrodes and obtaining resulting signals via the plurality of receiver electrodes;
    wherein the plurality of transmitter electrodes and the plurality of receiver electrodes are disposed on a first metal layer of the input sensing device;

wherein the plurality of routing traces and the plurality of shielding blocks are disposed on a second metal layer of the input sensing device disposed beneath the first metal layer;

wherein at least a part of the processing system is disposed on one or more circuit layers disposed beneath the second metal layer;

wherein a respective shielding block of the plurality of shielding blocks is configured to shield a respective portion of a respective receiver electrode of the plurality of receiver electrodes from energy and/or noise originating from the one or more circuit layers.

12. The input sensing device according to claim 11, wherein the plurality of shielding blocks are not connected to the plurality of routing traces.

13. The input sensing device according to claim 11, wherein the plurality of shielding blocks are connected to one another via shielding traces.

14. The input sensing device according to claim 11, wherein a respective shielding block of the plurality of shielding blocks is formed of solid metal.

15. The input sensing device according to claim 11, wherein a respective shielding block of the plurality of shielding blocks comprises both a solid metal portion and a metal mesh portion.

16. A sensor device, comprising:
a plurality of metal layers; and
a plurality of dielectric layers, wherein each of the plurality of metal layers is disposed on a respective dielectric layer, and wherein each of the plurality of metal layers is separated from an adjacent metal layer by a respective dielectric layer;

wherein the plurality of metal layers include:
a first metal layer comprising a plurality of transmitter electrodes and a plurality of receiver electrodes;
a second metal layer disposed beneath the first metal layer, wherein the second metal layer comprises a plurality of routing traces for the plurality of transmitter electrodes and a plurality of shielding blocks; and
one or more circuit layers disposed beneath the second metal layer;

wherein a respective shielding block of the plurality of shielding blocks is configured to shield a respective portion of a respective receiver electrode of the plurality of receiver electrodes from energy and/or noise originating from the one or more circuit layers.

17. The sensor device according to claim 16, wherein the plurality of shielding blocks are not connected to the plurality of routing traces.

18. The sensor device according to claim 16, wherein the plurality of shielding blocks are connected to one another via shielding traces.

19. The sensor device according to claim 16, wherein a respective shielding block of the plurality of shielding blocks is formed of solid metal.

20. The sensor device according to claim 16, wherein a respective shielding block of the plurality of shielding blocks comprises both a solid metal portion and a metal mesh portion.

* * * * *